US008827729B2

(12) United States Patent
Gunreben et al.

(10) Patent No.: US 8,827,729 B2
(45) Date of Patent: Sep. 9, 2014

(54) ELECTRICAL CONNECTOR SYSTEM

(75) Inventors: Michael Gunreben, Schwanstetten (DE); Thomas Schwerin, Nuremberg (DE); Thomas Bernhard Pabst, Nuremberg (DE)

(73) Assignee: Delphi International Operations Luxembourg S.a.r.l., Luxembourg (LU)

( * ) Notice: Subject to any disclaimer, the term of this patent is extended or adjusted under 35 U.S.C. 154(b) by 73 days.

(21) Appl. No.: 13/639,555

(22) PCT Filed: Apr. 5, 2011

(86) PCT No.: PCT/EP2011/055242
§ 371 (c)(1),
(2), (4) Date: Dec. 6, 2012

(87) PCT Pub. No.: WO2011/124563
PCT Pub. Date: Oct. 13, 2011

(65) Prior Publication Data
US 2013/0078835 A1   Mar. 28, 2013

(30) Foreign Application Priority Data

Apr. 9, 2010  (WO) .................. PCT/IB2010/001278

(51) Int. Cl.
| *H01R 29/00* | (2006.01) |
| *B60L 3/04* | (2006.01) |
| *H01R 13/70* | (2006.01) |
| *H01R 13/658* | (2011.01) |
| *B60L 3/00* | (2006.01) |
| *B60L 11/18* | (2006.01) |
| *H01R 13/6593* | (2011.01) |
| *H01R 13/639* | (2006.01) |
| *H01R 13/52* | (2006.01) |
| *H01R 13/53* | (2006.01) |
| *H01R 13/627* | (2006.01) |
| *H01R 13/44* | (2006.01) |

(52) U.S. Cl.
CPC .............. *H01R 13/70* (2013.01); *Y02T 90/121* (2013.01); *H01R 13/639* (2013.01); *H01R 13/5205* (2013.01); *B60L 3/04* (2013.01); *H01R 13/658* (2013.01); *B60L 2270/34* (2013.01); *H01R 13/701* (2013.01); *Y02T 10/7005* (2013.01); *B60L 3/0069* (2013.01); *H01R 13/5202* (2013.01); *B60L 11/1818* (2013.01); *Y02T 10/7088* (2013.01); *Y02T 90/14* (2013.01); *H01R 13/53* (2013.01); *H01R 13/6593* (2013.01); *H01R 13/6271* (2013.01); *B60L 2270/32* (2013.01); *H01R 13/44* (2013.01)
USPC ........................................................ 439/188

(58) Field of Classification Search
CPC .. H01R 13/658; H01R 13/6593; H01R 13/70; H01R 13/701; H01R 13/44; H01R 13/5202; H01R 13/5205; H01R 13/53; H01R 13/6271; H01R 13/639
USPC ......... 439/188, 350–354, 357–358, 131, 133, 439/137, 145, 166, 152, 252, 476.1, 488, 439/489, 491
See application file for complete search history.

(56) References Cited

U.S. PATENT DOCUMENTS

| 5,639,256 A | 6/1997 | Endo et al. ..................... 439/358 |
| 5,751,135 A | 5/1998 | Fukushima et al. .......... 320/107 |

(Continued)

FOREIGN PATENT DOCUMENTS

| EP | 2 109 201 A2 | 10/2009 |
| JP | 2002-343506 | 11/2002 |

(Continued)

*Primary Examiner* — Edwin A. Leon
(74) *Attorney, Agent, or Firm* — Robert J. Myers

(57) ABSTRACT

The present invention relates to an electrical connector system. The electrical connector system includes a first connector to be mated to a corresponding counter connector and it is further adapted to be connected to a signal circuit for activating an electrical power source upon switching. As a safety feature, the connector system further includes a connector position assurance (CPA) member assigned to the first connector, which is movable, whereby an end position is not reachable if the first connector is incorrectly mated to the counter connector. The CPA member is adapted to interact with the signal circuit if placed in said end position so that it activates of the electrical power source.

11 Claims, 3 Drawing Sheets

(56) References Cited

U.S. PATENT DOCUMENTS

| | | |
|---|---|---|
| 6,964,579 B2 * | 11/2005 | Seminara et al. .............. 439/352 |
| 7,404,720 B1 | 7/2008 | Frey et al. ..................... 439/133 |
| 2006/0110957 A1 | 5/2006 | Lekic et al. .................... 439/131 |
| 2009/0286418 A1 | 11/2009 | Takehara ....................... 439/352 |
| 2011/0212644 A1 * | 9/2011 | Itzenhuiser et al. .......... 439/352 |

FOREIGN PATENT DOCUMENTS

| | | |
|---|---|---|
| WO | WO 2008/109109 A1 | 9/2008 |
| WO | WO 2010/015889 A1 | 2/2010 |

* cited by examiner

ELECTRICAL CONNECTOR SYSTEM

1. FIELD OF THE INVENTION

The present invention relates to electrical connector systems with additional features to improve the safety of the connection process, in particular with regard to electrical arcing.

2. TECHNICAL BACKGROUND

In high power applications it is often necessary to switch off the electrical power source before two connectors which connect the power lines are mated or unmated. Indeed, it is safer not to leave power terminals supplied by high power while the connectors are unmated and consequently while the terminals may be exposed. It is also useful to prevent possible arcing when the connectors are close to each other but not yet fully mated as it inevitably occurs during mating and unmating. Such arcing may be dangerous for persons connecting or disconnecting the power line and it may additionally damage the connectors. Further, a high voltage peak which may be induced by the arcing can damage electrical devices which are connected to the power system. Therefore, commonly the high power has to be turned off manually before e.g. working on the high power system. This causes danger because the manual turning off can easily be forgotten, if e.g. untrained personal is involved or in the case of an accident where connections might have to be open rapidly. Therefore, solutions have been developed in the art providing ways for automatic turning off the power supply in the case that the power connectors are e.g. only in a pre-mated position.

An example of such a solution is described in U.S. Pat. No. 5,751,135. This document proposes a charging connector device for electrical vehicles comprising a security mechanism to prevent dangerous arcing during the connection of the charging device and the power plug of the vehicle. First, when the charging device and the power plug are not yet fully mounted, a security lever presses a micro switch which turns off the main electrical power supply. Then, when the two members are correctly mated, the security lever releases the micro switch and the power is turned on. The same mechanism turns off the power during disconnecting the charging device and the power plug.

Further, connector position assurance (CPA) members are known in the art, to assure the correct mechanical coupling of two connectors with each other. Such members typically can have one or more of the following functions. For one they provide a mechanical secondary locking system for the connectors, where typically the CPA member can only be moved in the locking position when the electrical connectors are completely mated. In this locking position, the two connectors are mechanically locked together. Secondly, the CPA member serves as a visual checking means for the correct mounting. For this purpose, the CPA member is constructed so that it can be visually distinguished if the CPA member is moved fully into said locking position or not. With this function the technician can easily judge the state of the high power connection by simply looking at the CPA member.

In addition, many high power applications require electromagnetic shielding of the electrical power lines. In particular in the case of hybrid or electrical vehicles it can be important to establish an electromagnetic shielding continuity from e.g. a power supply to the power dissipation device without interruptions. Such continuous electromagnetic shielding is problematic if the high power line includes connectors, since stripping is necessary for mounting of cables in connectors. Therefore, the electromagnetic cable shielding has to be bridged over the connectors. In the art commonly shielding bridges are mounted around the whole arrangement of terminals, power lines and housing parts, or the housing itself is made of conducting material or the housing includes a lining of conductive material to serve as shielding bridge. Unfortunately, in those cases it is necessary to provide openings in the shielding bridge to allow for the CPA member to function since it has to interact with parts of the connectors. This is a consequence of the requirement to provide compact connector systems, which for most applications is inevitable. Otherwise, more complicated CPA arrangements could be constructed around the connector assembly containing the shielding bridge, leading to rather large and expensive connector systems. This need for electromagnetic shielding combined with the need for a CPA member results in the problem to provide a new electrical connector system.

An aim of the present invention is to provide a new electrical connector system which solves or minimizes at least on of the above described problems. It is another object of the present invention to provide an electrical connector system with an electrical security system guaranteeing the current flow through the connector only in the case of correct connector mating. It is a further object of the present invention to solve the above described problems with an inexpensive product which is simple to manufacture and assemble.

These and other objects which become apparent upon reading the following description are solved by a connector system according to claim 1.

3. SUMMARY OF THE INVENTION

According to the invention a new electrical connector system (in the following denoted as "the system") is provided which is in particular suited for the use in high power applications, such as a power of at least 1.5 kW. The new system comprises a first connector which is adapted to be mated to a corresponding counter connector, and the system is adapted to be connected to a signal circuit, which e.g. can be an electrical circuit. Further, the system comprises a movable connector position assurance (CPA) member. This CPA member can be moved to an end position only when the first connector is correctly mated to the counter connector. When placed in the end or final position, the CPA member interacts with the signal circuit, which thereby activates the electrical power source. The power source supplies the electrical power transmitted through the system. This interaction of the CPA member with the signal circuit may be e.g. a turning on or off of an electrical circuit, e.g. achieved by connecting or disconnecting two contacts by means of e.g. a shorting clip. The following activation of the electrical power source may e.g. be achieved directly, if the signal circuit is connected e.g. to a switch of the electrical power source or it may be achieved indirectly if the signal circuit is connected e.g. to suitable control units. In this case, the signal circuit could be connected to a control device which detects whether the signal circuit is switched on or off and reacts by sending a signal e.g. to a further electrical device, which reacts to this signal by enabling the electrical power. It is important to note that moving the CPA member out of the locked position results in the opposite interaction with the signal circuit, which in turn stops the activation of the power source. In other words, if the interaction is realized e.g. by connecting two contacts with a shorting clip as described above to close the signal circuit, moving the CPA member out of its locked position then results in the disconnection of said contacts, thereby opening the signal circuit. In this case the above mentioned control device now detects the opening of the signal circuit and reacts by sending a different signal which now tells the above mentioned further device to disable the electrical power. In summary, this interplay of CPA member, signal circuit and electrical power source guarantees that the main electrical power is transmitted through the system only, if the connectors are mated properly. Hereby a safety system is provided which prevents for instance the above described dangerous arcing which can occur if connectors of a high power line are approached to each other while the high power is turned on.

In a preferred embodiment, the CPA member further locks the correctly mated position of the first connector and the counter connector mechanically. Hereby, the CPA member can e.g. provide a secondary locking system by e.g. constraining the primary locking system which serves for the correct mating of the two connectors in the first place. In this way, the connectors cannot be unmated if the CPA member is in its locked position. Thereby, an additional safety system is provided which hampers the disconnection of the two connectors when the main power is turned on. To physically disconnect the two connectors, the CPA member inevitably has to be moved out of its locked position, thereby automatically turning of the main electrical power. Then the two connectors can safely be unmated. Preferably the electrical connector system comprises a switching device which is adapted to switch the signal circuit and the CPA member is adapted to interact physically with this switching device. If the signal circuit is e.g. realized in form of an electrical circuit, a switching device could e.g. be an electrical switch. The CPA member can e.g. interact physically with this switch, by pressing the switch when moved in the locked position. The switch then turns on or off the electrical circuit, which results in the turning on of the electrical power as described above. In a different embodiment, the switching device could be realized in form of two electrical contacts which close the signal circuit when they are in contact. This could be realized e.g. by two metallic wires which are bent in a U-shaped form, the curves of the U-shaped wires pressed against each other by a spring force, thereby establishing an electrical connection closing the signal circuit. In this case, the CPA member could be an electrically isolated tongue, being movable in between the two wires, thereby disconnecting the electrical connection and opening the signal circuit. A further embodiment exemplarily is given by the same members used inversely. In this case the two U-shaped wires are initially disconnected. When the CPA member is placed in its end position, it moves one or both of the wires, thereby pressing the two into electrical contact and closing the signal circuit. In a further embodiment the switching device is realized in form of a variable resistor. In this case, the CPA member is adapted to interact with the variable resistor changing the resistance of the signal circuit. In an exemplary case of a closed electrical circuit connected to a secondary power supply, this resistance change results in a change of electrical current. In this embodiment it is possible, e.g. by lowering the resistance to achieve a higher current activating a switching mechanism. In another embodiment, the signal circuit comprises two electrical contacts and the CPA member comprises a shorting clip to connect the two electrical contacts when inserted correctly into its end position. Thus, the signal circuit is initially open and closed by the CPA member.

Preferably, the electrical connector system comprises at least one electromagnetically shielded conductor and at least one electromagnetic shielding element. The conductor may e.g. be an electrical power cable with an electromagnetic shielding, an insulating cable sheath and wire strands. The electromagnetic shielding element can e.g. continue the cable shielding over the system in assembled condition. Preferably the electromagnetic shielding element is realized essentially in form of a sleeve. The cable may e.g. be equipped with a contact terminal to be connected to another cable. The shielding sleeve can be mounted over the contact terminal e.g. inside a connector housing, while the CPA member and the signal circuit are preferably mounted outside of said sleeve. In a preferred embodiment the electromagnetic shielding sleeve is electrically connected to the cable shielding without the need for any separate contact spring members (as e.g. described in EP 2 109 201 A2). This could e.g. be realized by crimping a portion of said shielding sleeve onto a stripped portion of the cable, where the cable shielding is exposed, thereby bringing these two members into electrical contact.

Preferably, said electromagnetic shielding sleeve provides an electromagnetic shielding of more than 40 dB, preferably of more than 55 dB, most preferably of more than 70 dB in the range of 10 kHz-5 MHz; and of more than 40 dB, preferably of more than 55 dB, most preferably of more than 65 dB in the range of 5 MHz-500 MHz. Further, the electrical connective system is further adapted to transmit currents of more than 10 A, preferably more than 25 A, and most preferably more than 50 A. In all the embodiments, it is preferred that the electrical connector system is adapted to safely transmit a power of more than 1.5 kW, preferably more than 10 kW, preferably more than 20 kW, yet more preferably more than 30 kW, even more preferably more than 40 kW and most preferred more than 50 kW. Obviously, the values for power and current depend on the intended application.

In a preferred embodiment the electrical connector system comprises sealing elements which are adapted to seal the electrical connector system against moisture in assembled condition. In a preferred embodiment the electrical connector system comprises further a connector housing which is adapted to be assembled with a corresponding counter connector housing of the counter connector. Preferably, this connector housing can be locked to the corresponding counter connector housing by means of a flexible latching arm. In a preferred embodiment, the CPA member comprises a locking surface which in mated condition prevents a movement of the latching arm, thereby blocking the position of the latching arm. Due to this locking mechanism—an example of which is shown in detail in the figures—the connector housings cannot be disconnected as long as the CPA member is in its end position.

The invention is further directed to an electrical connector system for high power applications as described above, comprising the counter connector and the signal circuit.

4. DESCRIPTION OF THE PREFERRED EMBODIMENT

In the following the invention is described exemplarily with reference to the enclosed figures in which.

Figure 1:
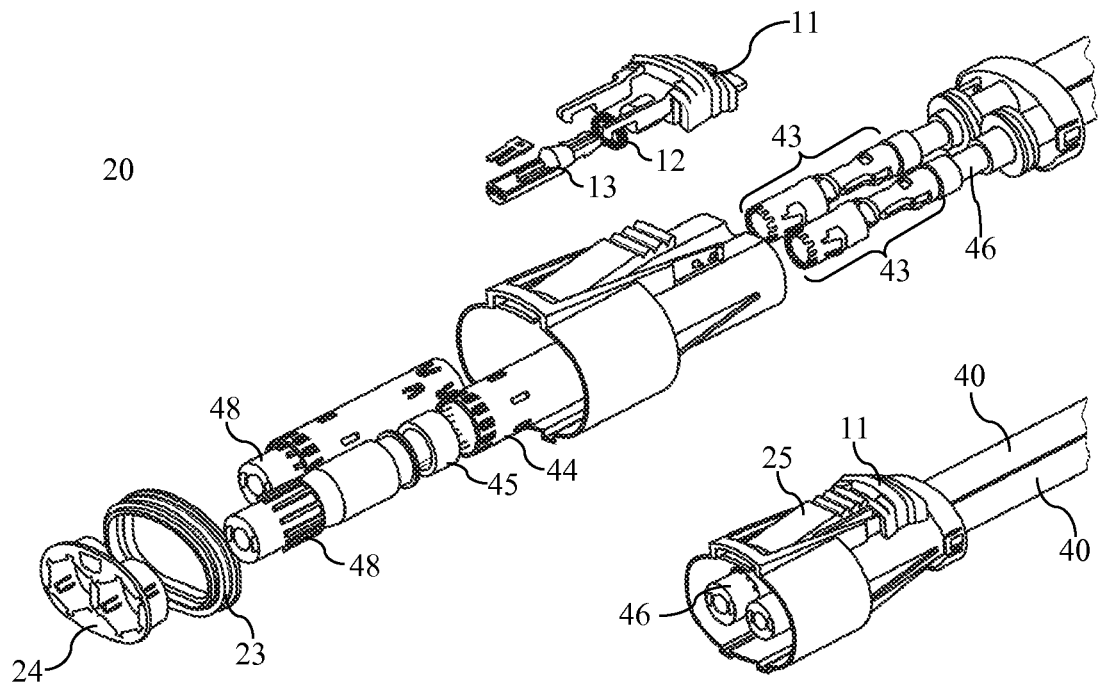
FIG. 1 is a schematic illustration of a connector system in accordance with the invention.

FIG. 1 is a schematic illustration showing an electrical connector system comprising a first connector 20 and a CPA member 10. In the figure, the upper illustration shows an exploded view and the lower illustration shows the parts in assembled condition. Exemplarily two power cables 40 are connected each to respective female contact terminals 43. These female contact terminals 43 are in assembled condition inserted into an isolation tube 48, which in assembled condition is partially inserted into a shielding sleeve 44. The figure shows a contact spring member 45 which upon assembly is inserted into the shielding sleeve 44, next to the isolation tube 48 onto a stripped portion of cable 40, so that it establishes an electrical connection between the cable shielding 46 and the shielding sleeve 44. Thereby a shielding continuity over the connector assembly, respectively the female contact terminals 43 is achieved. Further, a connector housing 22 is shown which in assembled condition accommodates the described components. The housing 22 comprises a latching wing 25 whose function is described below in the context of FIGS. 3A and 3B. The housing 22 can be closed from the cable side by a cover 21. Thereby, the cover 21 presses two sealing rings 42 against a corresponding sealing surface (not visible in the figure) inside the connector housing 22. The sealing rings 42 are mounted to the cables 40 and in assembled condition they serve for sealing the first connector 20 against moisture from the cable side. Analogously, a fastener 24 presses a further sealing member 23 against a corresponding sealing surface, so that in assembled condition the connector housing is also sealed against moisture from the opposite side.

The CPA member 10 comprises a shorting clip 14, a support portion 13, a CPA sealing ring 12 and a CPA switch 11, the functions of which are described below.

Figure 2:
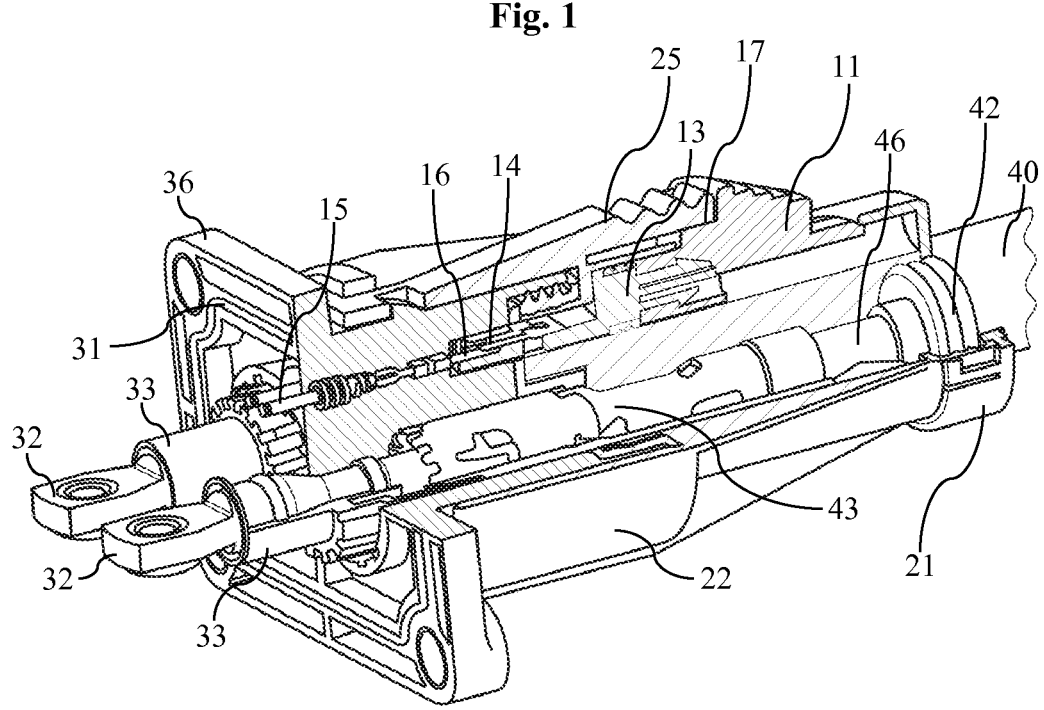
FIG. 2 is a perspective and partially cut view showing a preferred embodiment of a first connector 20 assembled with parts of a corresponding counter connector 30.
Figure 5:
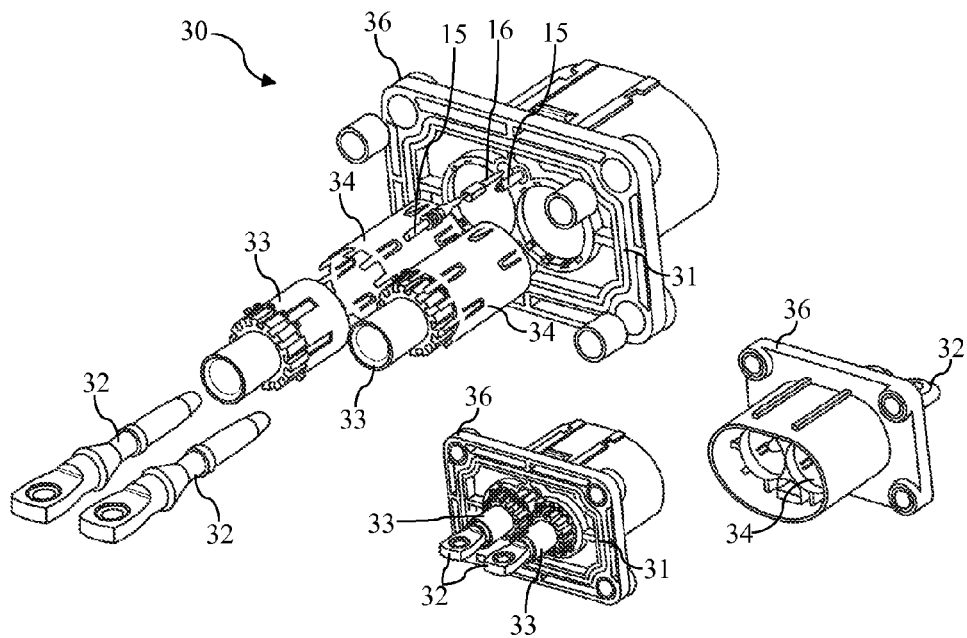
FIG. 5 illustrates the assembly of a preferred embodiment of the corresponding counter connector 30.

FIG. 2 shows the assembled first connector 20 in completely mated condition with a corresponding counter connector 30 (the counter connector 30 is shown in more detail in FIG. 5). For illustrative purposes in the figure parts of the connectors 20 and 30 are cut away so that the interior components are visible. As one can see, male contact terminals 32 of the counter connector 30 are inserted partially into the female contact terminals 43. The figure shows further two signal cables 15 of a signal circuit comprising contact ends 16. In an actual realization, those cables are part of a signal circuit, i.e. a designated electrical circuit separate from the actual electrical power circuit established by cables 40, and further connected to e.g. electrical control units for activating, respectively deactivating, a power source. In the figure, the contact ends 16 are in electrical contact through the shorting clip 14 (only the foreground contact end is fully visible in the figure). The shorting clip 14 is mounted on the support portion 13, which is further mounted on the CPA switch 11. In this figure, the CPA switch 11 is inserted completely into its final position, whereby a locking surface 17 presses from below against an end of the latching arm 25, thereby blocking the same in the shown position. The function of the locking lever 25 is illustrated in more detail in FIGS. 3A and 3B.

Figure 3A:
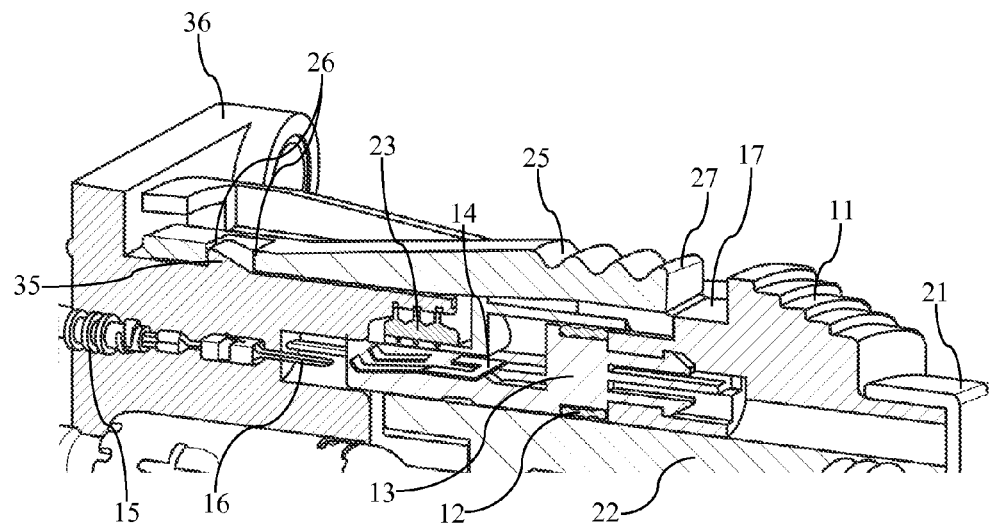
FIGS. 3A and 3B show details of the arrangement of FIG. 2.
Figure 3B:
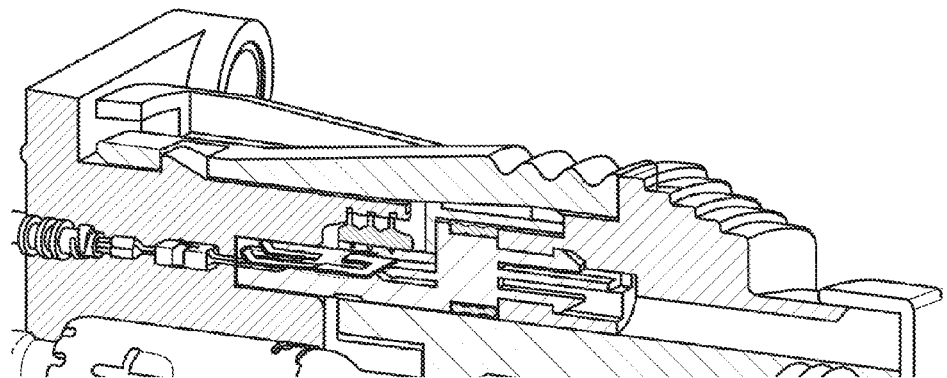

FIGS. 3A and 3B show detailed views of the assembly of FIG. 2 from a different perspective. The two figures illustrate the function of the CPA switch 11. In FIG. 3A, the CPA member 10 is not yet in its final position and therefore a gap between the locking lever 25 and the CPA switch 11 is visible. Form the figure the skilled person can derive, that during assembly, when a counter connector housing 36 is inserted into the connector housing 22, the locking protrusion 35 presses the left part of the latching arm 25 up until it snaps down, when the locking clearance 26 fits over the locking protrusion 35. This movement of the latching arm 25 is only possible if the CPA member is not yet in its final position.

When the CPA is in its final position, the locking surface 17 of the CPA member 10 is arranged under the right part of the latching arm 25, so that it is no longer possible to press the right part of the latching arm and consequently, it is no longer possible to unlock the locking clearance 26 from the locking protrusion 35. From the figure one can derive that in this situation the counter connector housing 36 and the connector housing 22 are locked together by means of the fixing elements 26 and 35.

In FIG. 3A the CPA member 10 is not in its final position and the shorting clip is not in electrical contact with the contact ends 16. As one can see, only when fully inserted, as shown in FIG. 3B, the shorting clip 14 is in contact with the contact ends 16 of the signal cables, thereby closing the signal circuit. The power source is activated only when the CPA is in its final closed position. Respectively, the power source will be deactivated only when the CPA will be opened. It will not be possible to un-mate the connector assembly while the power source is still activated. In FIGS. 3A and 3B one can further identify part of the CPA sealing 12 which is pressed between the support arm 13 and a surface of the connector housing 22 as well as one can see part of the sealing member 23 which is described above in the context of FIG. 1.

In the shown embodiment of the connector system, the signal cables 15 are mounted in the counter connector 30. However, the skilled person will understand that these two cables 16 could as well be mounted in the first connector 20, still fulfilling the same function.

Figure 4:
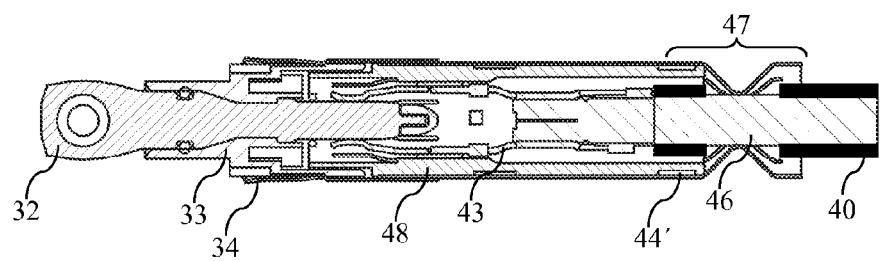
FIG. 4 is a cross-sectional view showing a connection element of the electrical connector system.

FIG. 4 shows a cross section of the interior parts of the connector arrangement of FIG. 2, in particular a power cable 40, a male contact terminal 32 and a female contact terminal 43. The female contact terminal 43 is crimped on an end of the power cable 40. The male terminal 32 is partially inserted into the female contact terminal 43 which is mounted inside the isolation tube 48. The male contact terminal 32 is further mounted on an isolation member 33. The assembly of the two contact terminals is electromagnetically shielded by a shielding element 34 assigned to the male terminal and a shielding sleeve 44' assigned to the female terminal 43. The shielding sleeve 44' is similar to the above mentioned shielding sleeve 44 of FIG. 1; however, the shielding sleeve 44' comprises a weakened portion 47 which serves to establish an electrical contact of the shielding sleeve 44' to the cable shielding 46 without the use of the above mentioned contact spring member 45. In the embodiment of FIG. 4, the electrical contact is established by contracting the weakened portion 47 of the shielding sleeve 44' inwardly until it contacts the cable shielding 46. In the figure, one can see that said weakened portion 47 is realized by cutting slots into the shielding sleeve 44', which are oriented essentially parallel to the axis of the shielding sleeve 44'. The two electrically connected shielding members 34 and 44', which are due to the weakened portion 47 in electrical contact with the cable shielding 46, provide a shielding continuity for the cable shielding over the area in the connector system where the power cable 40 has to be stripped.

FIG. 5 shows another schematic illustration of the counter connector 30. The upper part of the figure shows not yet assembled single components of the counter connector 30 while the lower part of the figure shows its assembled condition from two different perspectives. The male contact terminals 32 are mounted inside isolation members 33, which are further mounted inside the shielding elements 34. The shielding elements 34 are then mounted inside the counter connector housing 36. The figure further shows the two signal cables 15 of the signal circuit, comprising the contact ends 16. The counter connector 30 comprises further a sealing o-ring 31.

Figure 6:
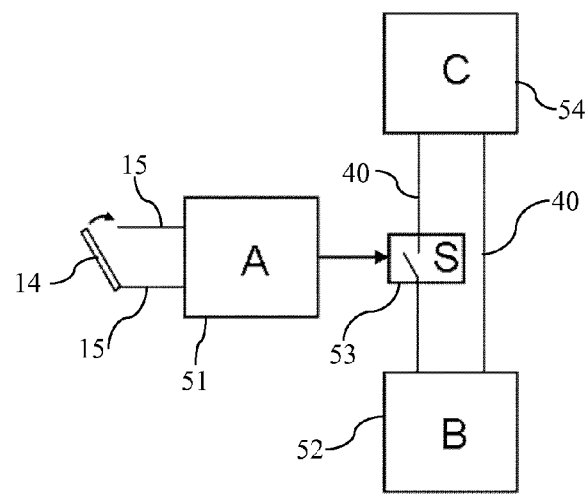
FIG. 6 is a schematic illustration of an exemplary signal circuit.

This sealing o-ring 31 is adapted to be pressed against a corresponding surface of a further component, on which the counter connector is mounted. FIG. 6 is a schematic drawing of an exemplary signal circuit. Two signal cables 15 enter an electrical acquisition unit 51. This acquisition unit 51 can detect whether the signal cables 15 are in electrical contact or not. If the contact state of the signal cables 15 is changed, the acquisition unit 51 sends a corresponding signal to the switching unit 53. This switching unit 53 reacts to the signal by opening or closing a switch incorporated exemplarily in one of the power cables 40. If closed, the power supply 52, which can be e.g. a battery of an electrical car, provides electrical power to the consumer 54, which could be the engine of the electrical car.

The invention claimed is:

1. An electrical connector system, comprising:

a first connector;

a second connector configured to be mated to the first connector;

a latching means configured to secure the first connector to the second connector when the first connector is completely mated with the second connector; and a connector position assurance (CPA) member, said CPA member being movable from a start position to an end position, wherein said latching means prevents movement of the CPA member to the end position when the first connector is not completely mated to the second connector and the CPA member prevents the latching means from releasing the first connector when the CPA member is in the end position and wherein when moved to said end position, the CPA member activates a signal circuit to enable an electrical power source.

2. The electrical connector system according to claim 1, wherein the signal circuit comprises a switching device and wherein said CPA member contacts the switching device when moved to the end position.

3. The electrical connector system according to claim 2, wherein the switching device comprises at least one of the group consisting of:

a micro switch;

two electrical contacts integrated in the signal circuit, closing the signal circuit when in electrical contact with each other; and a variable resistor.

4. The electrical connector system according to claim 1, wherein the signal circuit comprises two electrical contacts and the CPA member comprises a shorting clip configured to connect the two electrical contacts when the CPA member is moved to the end position, thereby activating the signal circuit.

5. The electrical connector system according to claim 1, comprising an electromagnetic shielding element and an electromagnetically shielded conductor, the electromagnetic shielding element establishing shielding continuity for the electromagnetically shielded conductor throughout the electrical connector system when the first connector is correctly mated to the second connector.

6. The electrical connector system according to claim 5, wherein the electromagnetic shielding element is characterized as an electromagnetic shielding sleeve and wherein the CPA member and the signal circuit are disposed outside of the electromagnetic shielding element.

7. The electrical connector system according to claim 6, wherein the electromagnetic shielding element is electrically connected to the electromagnetically shielded conductor without any separate contact spring members.

8. The electrical connector system according to claim 5, wherein the electromagnetic shielding element provides shielding over the electrical connector system of more than 70 dB in the range of 10 kHz to 5 MHz and more than 65 dB in the range of 5 MHz to 500 MHz when the first connector is correctly mated to the second connector.

9. The electrical connector system according to claim 5, comprising sealing elements forming a sealed area between the first connector and the second connector when the first connector and the second connector are mated, wherein the electromagnetic shielding element is completely located within the sealed area.

10. The electrical connector system according to claim 1, wherein the electrical connector system is configured to transmit a power of more than 50 kW.

11. The electrical connector system according to claim 1, further comprising the signal circuit.

* * * * *